United States Patent [19]

Ito et al.

[11] Patent Number: 4,830,127

[45] Date of Patent: May 16, 1989

[54] SYSTEM AND METHOD FOR CONTROLLING A STEERING REACTION FORCE IMPOSED ON A STEERING WHEEL

[75] Inventors: Ken Ito, Yokohama; Taketoshi Kawabe, Tokyo, both of Japan

[73] Assignee: Nissan Motor Company, Ltd., Yokohama, Japan

[21] Appl. No.: 944,512

[22] Filed: Dec. 22, 1986

[30] Foreign Application Priority Data

Dec. 27, 1985 [JP] Japan ................ 60-293025

[51] Int. Cl.[4] .............................. B62D 5/06
[52] U.S. Cl. ................... 180/79.1; 180/142; 364/424.01
[58] Field of Search ............... 180/142, 79.1; 364/424

[56] References Cited

U.S. PATENT DOCUMENTS

| 3,866,706 | 2/1975 | Lincke et al. | 180/142 |
| 3,939,938 | 2/1976 | Inoue | 180/142 |
| 4,342,279 | 8/1982 | Seko et al. | |
| 4,412,594 | 11/1983 | Furukawa et al. | 180/142 |
| 4,604,611 | 8/1986 | Seko et al. | |
| 4,607,717 | 8/1986 | Nakayama | |
| 4,626,994 | 12/1986 | Yabe et al. | 180/142 |
| 4,650,019 | 3/1987 | Yanai et al. | |

FOREIGN PATENT DOCUMENTS 59-63264 4/1984 Japan .

Primary Examiner—Charles A. Marmor
Assistant Examiner—Donn McGiehan
Attorney, Agent, or Firm—Foley & Lardner, Schwartz, Jeffery, Schwaab, Mack, Blumenthal & Evans

[57] ABSTRACT

A system and method for controlling a steering reaction force in which at least one of motion state variables of a vehicle is estimated when a steering wheel of the vehicle is operated on the basis of a vehicle model which represents a mathematical model of the vehicle having a desired performance of motion, a target value of the steering reaction force imposed on a steering wheel is determined on the basis of the estimated value of the motion state variable, and the steering reaction force imposed on the steering wheel is generated so as to become substantially equal to the target value. The steering reaction force control system achieves the generation of the steering reaction force on the steering wheel on the basis of a vehicle turning motion information as motion state variables such as a lateral acceleration of the vehicle and/or yaw rate of the vehicle.

18 Claims, 4 Drawing Sheets

SYSTEM AND METHOD FOR CONTROLLING A STEERING REACTION FORCE IMPOSED ON A STEERING WHEEL

BACKGROUND OF THE INVENTION

1. Field of the Invention

The present invention relates to a system and method responsive to a curve motion of a vehicle for controlling a steering reaction force imposed on a steering wheel of a vehicle.

2. Description of the Prior Art

Power steering systems have recently been adopted in many automotive vehicles. Such power steering systems add assistance torques through hydraulic boosting arrangements to steering forces applied to steering wheels by drivers and work to assist steering operations.

An electrically assisted power steering system has been proposed, as exemplified by a Japanese Patent Application Unexamined Open No. Sho 59-63264 published on Apr. 10, 1984, except the conventional hydraulically assisted power steering system.

FIG. 1 schematically shows the electrically assisted power steering system disclosed in the above-identified Japanese Patent Application.

In FIG. 1, a steering wheel 1 is connected to a first steering shaft 2. The first steering shaft is connected to a second steering shaft 5 via a first universal joint 4.

A direct-current (DC) motor DM is mounted on the second steering shaft 5 via a speed reducer 9. In addition, a steering torque sensor 8 is attached to the second steering shaft 5 for detecting a torque $T_c$ (hereinafter referred to as "steering torque") applied to the steering wheel 1. A third steering shaft 7 is connected to the second steering shaft 5 via a second universal joint 6. A lower end of the third steering shaft 7 is connected to a rack-and-pinion gear box 3.

It is noted that a gradient r between the first steering shaft 2 and second steering shaft 5 is set to be equal to the gradient r between the second steering shaft 5 and third steering shaft 7.

The above-described gear box 3 is connected to a tie rod 17. The tie rod 17 is connected to a knuckle arm 16 of a tire wheel 12.

A controller denoted by 10 receives an electrical signal indicating a detected value $T_c$ of the steering torque applied to the steering wheel 1 from the steering torque sensor 8 and controls a drive current $I_p$ sent to the servo motor DM so that the motor DM generates an assistance torque $T_A$ corresponding to the detected value $T_c$ of the steering torque. The conventional electrically assisted power steering system is mainly designed to reduce the steering force applied to the steering wheel 1 by the driver. Therefore, the driver, who receives turning (curve) motion information of the vehicle from a steering reaction force of the steering wheel 1, feels that he cannot obtain sufficient information on the turning motion.

In other words, the driver generally physically feels the steering reaction force when he operates the steering wheel and a change in a state variable of the vehicle's motion.

The driver evaluates an easiness in driving on the basis of these feelings.

In addition, the driver, in general, directs his attention toward a yaw rate of the vehicle in a middle and low vehicle speed regions and, in turn, toward a lateral acceleration in a high vehicle speed region.

In this way, although the driver requires such turning motion information as the lateral acceleration, or yaw rate, he relies only on his own feelings.

SUMMARY OF THE INVENTION

It is an object of the present invention to provide a system and method for controlling a steering reaction force for a vehicle which improves the easiness in steering operation of the steering wheel.

The above-described object can be achieved by providing a system for controlling a steering reaction force for a vehicle, comprising: (a) first means for estimating at least one of motion state variables of a vehicle when a steering wheel of the vehicle is operated on the basis of a vehicle model representing a mathematical model of the vehicle having a desired motion performance; (b) second means for determining a target value of the steering reaction force imposed on a steering wheel on the basis of an estimation value of the motion state variable estimated by the first means; and (c) third means for generating the steering reaction force imposed on the steering wheel so as to become substantially equal to the target value of the steering reaction force of the steering wheel determined by the second means.

The above-described object can also be achieved by providing a method for controlling a steering reaction force for a vehicle, comprising the steps of: (a) setting a vehicle model representing a mathematical model of a vehicle having a desired performance of motion; (b) estimating at least one of motion state variables of the vehicle on the basis of the vehicle model set in the step (a); (c) determining a target value of the steering reaction force imposed on a steering wheel on the basis of an estimation value of the motion state variable estimated in the step (b); and (d) generating the steering reaction force imposed on the steering wheel so as to become substantially equal to the target value of the steering reaction force of the steering wheel determined in the step (c).

DETAILED DESCRIPTION OF THE PREFERRED EMBODIMENTS

Figure 1:
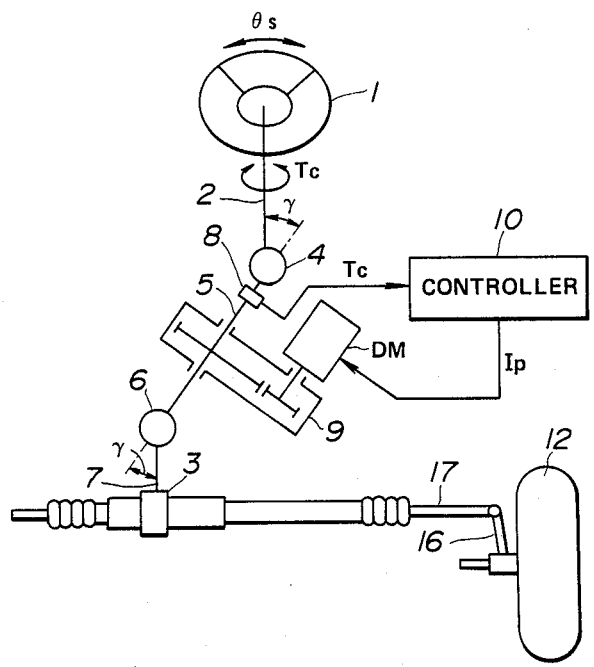
FIG. 1 is a schematic view of an electrically assisted power steering system disclosed in the Japanese Patent Application Unexamined Open No. Sho 59-63264.

Reference will hereinafter be made to the drawings in order to facilitate understanding of the present invention. The conventional electrically assisted power steering system has been described with reference to FIG. 1. A general concept of the present invention will briefly be described below. Motion state variable estimating means estimates at least one variable of motion state of a vehicle when the steering operation is carried out on the basis of the vehicle model in which the vehicle having a desired motion performance is mathematically modeled. Steering reaction force target value determining means determines a target value $\overline{F}$ of the steering reaction force of the steering wheel on the basis of an estimated value M* derived from the motion state variable estimating means. Steering reaction force generating means generates the steering reaction force on the steering wheel so that the steering reaction force becomes equal to the target value $\overline{F}$. In this way, the turning motion information such as a yaw rate and lateral acceleration can be generated in the steering wheel operation system.

Figure 2:
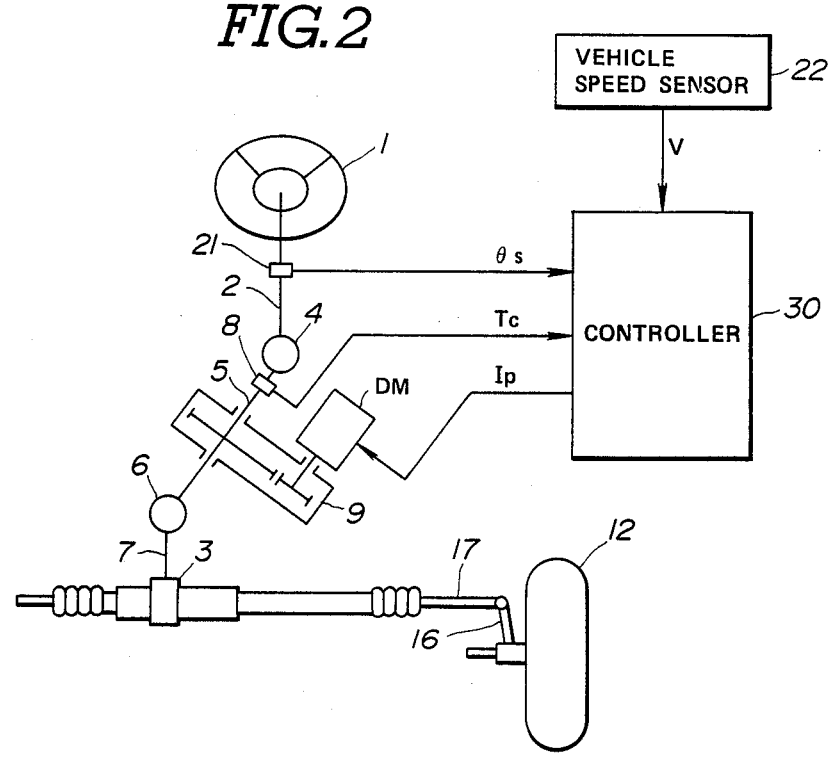
FIG. 2 is a schematic view of the steering reaction force controlling system in a first preferred embodiment according to the present invention.

FIG. 2 shows a construction of the steering reaction force controlling system in a first preferred embodiment. In FIG. 2, the like reference numerals as those shown in FIG. 1 designate corresponding elements. The detailed descriptions of the corresponding elements are omitted here since these elements have been described in the "Description of the Prior Art".

In the first embodiment, the steering reaction force imposed on the steering wheel is adjusted according to the lateral acceleration $\alpha$ of the vehicle. The adjustment of the steering reaction force is carried out by a controller 30. The controller 30 may comprise a microcomputer or alternatively other electrical circuits.

The controller 30 receives a detected value $\theta$s of the steering angle of the steering wheel 1 detected by a steering angle sensor 21, e.g., attached to the first steering shaft 2 and a detected value V of a vehicle speed detected value $T_c$ of the steering torque applied to the steering wheel 1 and derived from the steering torque sensor 8.

The construction of the steering torque sensor 8 is exemplified by a U.S. Pat. No. 4,572,005, the disclosure of which is hereby incorporated by reference.

The construction of the steering angle sensor is exemplified by U.S. Pat. No. 4,342,279 and No. 4,604,611. The contents of the above-identified U.S. Patents are hereby incorporated by reference.

The controller 30 carries out a predetermined arithmetic operation on the basis of each input variable $T_c$, $\theta$s, and V and outputs the drive current $I_p$ for the servo motor DM required to generate the steering reaction force according to the lateral acceleration $\alpha$ of the vehicle.

Figure 3:
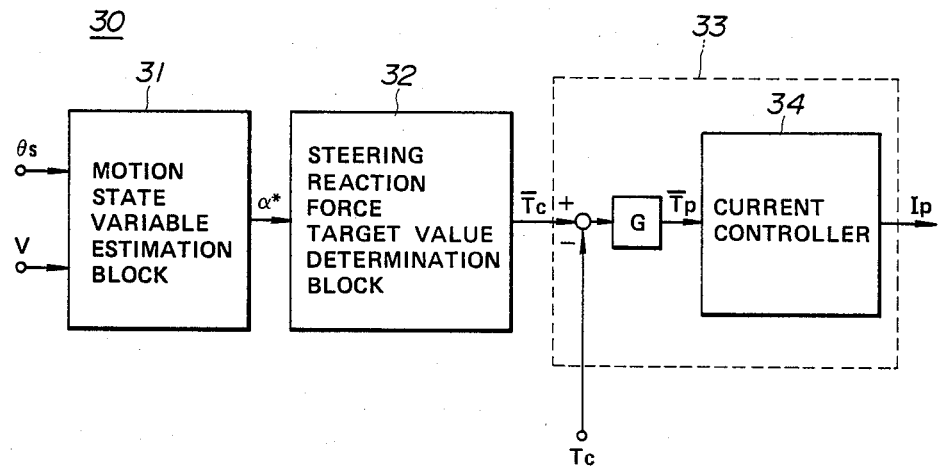
FIG. 3 is a functional block diagram of a controller 30 shown in FIG. 2.

FIG. 3 shows the functional block diagram of the controller 30.

A motion state variable estimation block 31 is provided with a mathematical model (hereinafter referred to as "vehicle model") for simulating the motion state of the vehicle. The motion state variable estimation block 31 estimates the lateral acceleration of the vehicle when the steering angle $\theta$s and vehicle speed V are set to the vehicle model. At this time, the estimated value $\alpha^*$ of the lateral acceleration corresponds to the lateral acceleration generated actually in the vehicle. The motion state variable estimation block 31 calculates the estimated value $\alpha^*$ of the lateral acceleration through the following equations.

$$\dot{\phi} = \int \ddot{\phi} dt \quad (1)$$

$$V_y = \int \dot{V}_y dt \quad (2)$$

$$\beta_F = (\theta s/N) - (V_y + L_F\dot{\phi})/V \quad (3)$$

$$\beta_R = -(V_y - L_R\dot{\phi})/V \quad (4)$$

$$C_F = eK_F \cdot \beta_F \quad (5)$$

$$C_R = K_R \cdot \beta_R \quad (6)$$

$$\ddot{\phi} = (2L_F C_F - 2L_R C_R)/I_Z \quad (7)$$

$$\alpha^* = (2C_F + 2C_R)/M \quad (8)$$

$$\dot{V}_y = \alpha^* - V \cdot \dot{\phi} \quad (9)$$

In the above equations (1) through (9), $\dot{\phi}$: yaw rate of the vehicle model,
$\ddot{\phi}$: yaw angular acceleration of the vehicle model,
$V_y$: lateral direction velocity of the vehicle model,
$\dot{V}_y$: translational acceleration in the lateral direction of the vehicle model,
$L_F$: distance between a front axle and center of gravity of the vehicle model,
$L_R$: distance between a rear axle and center of gravity of the vehicle model,
$\beta_F$: a side skid angle of a front wheel of the vehicle model,
$C_F$: a cornering force of a front wheel of the vehicle model,
$C_R$: a cornering force of a rear wheel of the vehicle model,
$eK_F$: an equivalent cornering power of a front wheel of the vehicle model,
$K_R$: a cornering power of a rear wheel of the vehicle model,
$I_Z$: yaw inertia of the vehicle model, and
M: vehicle body mass of the vehicle model, The estimated value $\alpha^*$ of the lateral acceleration thus calculated is sent to a steering reaction force target value determination block 32. The steering reaction force target value determination block 32 multiplies a proportional constant K previously set by the calculated lateral acceleration $\alpha^*$ to provide the steering reaction force target value $\overline{T}_c$. That is to say, $$\overline{T}_c = K\alpha^* \quad (10)$$

The proportional constant K derives a value such that there is a correlation between the lateral acceleration and the steering reaction force which is most appropriate based on experimentations and calculations. The constant value is set within the above-described controller 30. The steering reaction force target value $\overline{T}_c$ thus determined is sent to a motor control block 33.

Figure 4:
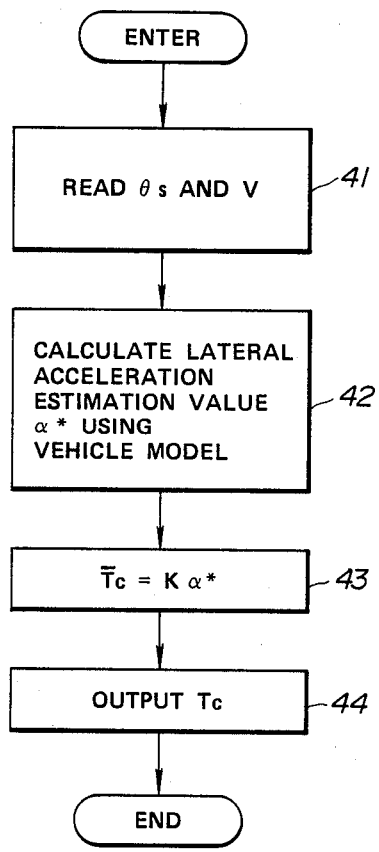
FIG. 4 is a flowchart of a series of processings executed when the controller is constituted by a microcomputer.
Figure 6:
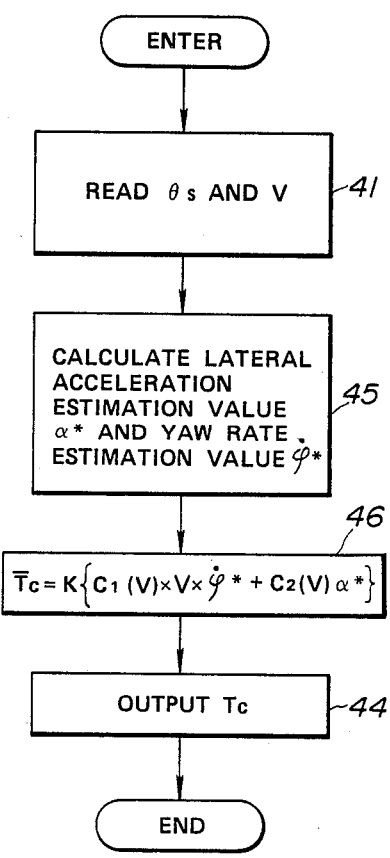
FIG. 6 is a flowchart of a series of processings executed when the controller in the second preferred embodiment is constituted by the microcomputer.

It is noted that it is possible that the above-described motion state variable estimation block 31 and steering reaction force target value determination block 32 are constituted by an arithmetic operation circuitry in the microcomputer. In this case, the above-listed equations are calculated in accordance with a flowchart shown in FIG. 4 by means of the microcomputer.

The microcomputer usually comprises a Central Processing Unit (CPU), a Random Access Memory (RAM), a Read Only Memory (ROM), an Input/Output Circuit, and a common bus.

In a step 41, the microcomputer reads the steering angle value $\theta$s and vehicle speed V.

In a step 42, the arithmetic operation carried out in the above-described motion state variable estimation block 31 is executed. In a step 43, the arithmetic operation carried out in the above-described steering reaction target value determination block 32 is executed.

The motor control block 33 controls the drive current $I_p$ of the servo motor DM so that the steering torque detection value $T_c$ coincides with the above-described steering reaction force target value $\overline{T_c}$.

An electric current controller 34 within the motor control block 33 adjusts the drive current $I_p$ of the servo motor DM in accordance with the electric current target value $\overline{I_p}$ which is a multiplication result between a deviation $(\overline{T_c} - T_c)$ of the steering reaction force target value $\overline{T_c}$ from the steering torque detection value $T_c$ and a predetermined gain G.

The steering torque $T_c$ of the steering wheel 1 is adjusted by means of the servo motor DM so as to become substantially equal to the above-described steering reaction force target value $\overline{T_c}$. At this time, the additional torque $T_F$ applied to the second steering shaft 5 by means of the servo motor DM acts to adjust the assistance torque $T_A$ *according to the magnitude of the above-described steering reaction force target value $\overline{T_c}$*. In addition, the additional torque $T_F$ in some cases acts to generate the torque in the direction of the steering wheel 1 opposite to the rotation direction toward which the driver operates.

In this way, in the first preferred embodiment, the steering reaction force, i.e., the steering torque $T_c$ is adjusted so as to become proportional to the estimated value $\alpha^*$ of the lateral acceleration of the vehicle estimated using the vehicle model.

Since the driver can perceive the change in the lateral acceleration of the vehicle from the change in the steering reaction force, the driver can obtain more accurate vehicle turning motion information.

In addition, since the lateral acceleration of the vehicle is estimated using the vehicle model, the change in the lateral acceleration can be perceived through the steering wheel even in a state where the actual measurement of the lateral acceleration is difficult as in a case of a turning transient motion (the turning transient motion refers to a state in which the steering angle $\theta s$ of the steering wheel 1 is continuously changed until the vehicle takes a steady turning motion or runs in a straight motion). Therefore, the adjustment of the steering reaction force will not be unstable even at the time of the turning transient motion.

Next, a second preferred of the present invention will be described.

In the first preferred embodiment, the steering reaction force of the steering wheel 1 is adjusted according to the lateral acceleration $\alpha$ which is one of the vehicle motion state variables. According to the present invention, it is possible to adjust the steering reaction force according to two or more motion state variables. In the second preferred embodiment, the steering reaction force is adjusted according to the two motion state variables of the vehicle lateral acceleration $\alpha$ and yaw rate $\dot{\phi}$.

The whole construction of the second preferred embodiment is the same as that of the first preferred embodiment shown in FIG. 2.

Figure 5:
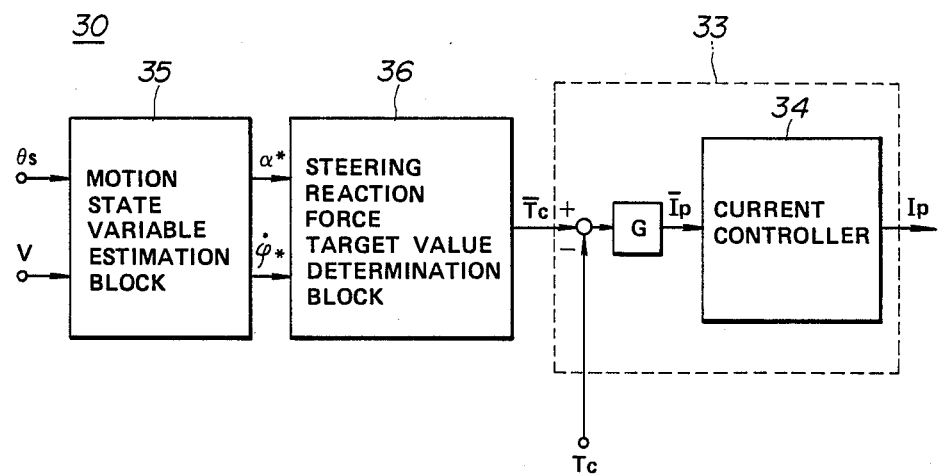
FIG. 5 is a functional block diagram of the controller in the steering reaction force controlling system in a second preferred embodiment.

FIG. 5 shows a functional block diagram of the controller 30 in the second preferred embodiment.

That is to say, the motion state variable estimation block 35 uses the vehicle model in which the vehicle is mathematically modeled in the same way as the motion state variable estimation block 31 in the first preferred embodiment, estimates the lateral acceleration and yaw rate of the vehicle both of which are made to correspond to the steering angle $\theta s$ of the steering wheel and vehicle speed V, and sends these estimation values to the steering reaction force target value determination block 36 as the lateral acceleration estimation value $\alpha^*$ and yaw rate estimation value $\dot{\phi}^*$.

These lateral acceleration estimation value $\alpha^*$ and yaw rate estimation value $\dot{\phi}^*$ are derived from the equation (1) and equation (8) after the calculations of the equations (1) through (9).

The steering reaction force target value determination block 36 carries out a predetermined average of weight mean for the above-described lateral acceleration estimation value $\alpha^*$ and yaw rate estimation value $\dot{\phi}^*$ to determine the steering reaction force target value $\overline{T_c}$.

That is to say, $$\overline{T_c} = K\{C_1(V) \times V \times \dot{\phi}^* + C_2(V) \times \alpha^*\} \tag{11}$$

The steering reaction force target value $\overline{T_c}$ is calculated using the equation (11). In the above-described equation (11), $C_1(V)$ and $C_2(V)$ denote weight coefficients, K denotes the proportional constant shown in the equation (10) and V denotes the vehicle speed. In addition, these weight coefficients $C_1(V)$ and $C_2(V)$ are a function of the vehicle speed V. For example, both weight coefficients $C_1(V)$ and $C_2(V)$ have the relationships shown in FIG. 7.

The motor control block 33 is the same as the motor control block 33 in the above-described first preferred embodiment. The drive current $I_p$ of the servo motor DM is controlled so that the steering torque detection value $T_c$ coincides with the steering reaction force target value $\overline{T_c}$.

In this embodiment, the steering reaction force, i.e., steering torque $T_c$ can be adjusted according to the lateral acceleration $\alpha$ of the vehicle and yaw rate. In addition, since in this embodiment the corelationship between the steering reaction force and lateral acceleration $\alpha$ and yaw rate $\dot{\phi}$ is adjusted in the weighting method, it is possible to pay an importance on the corelationship between the lateral acceleration $\alpha$ and steering reaction force or to pay an importance on the corelationship between the yaw rate and steering reaction force.

Figure 7:
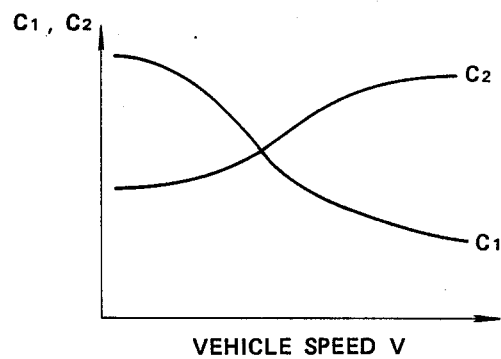
FIG. 7 is a characteristic graph representing a relationship between a weight coefficient and vehicle speed used in the second preferred embodiment.

For example, using the weight coefficients having the corelationship to the vehicle speed V as shown in FIG. 7, the steering reaction force is controlled with the corelationship between the steering reaction force and yaw rate taken into account in the low vehicle speed range and with the corelationship between the steering reaction force and lateral acceleration taken into account in the high vehicle speed range. That is to say, the steering reaction force control can be carried out with the turning motion information that the driver requires taken into account depending on the vehicle speed range.

It should be noted that each preferred embodiment has been described with the steering reaction force control system according to the present invention having been applied to the electrically assisted power steering system. However, the steering reaction force control system and method according to the present invention can also be applied to a vehicle in which the hydraulically assisted power steering system is mounted, alternatively to a vehicle in which no power steering system, or alternatively to a steer-by-wire type vehicle.

It is, however, noted that in a case when the steering reaction force control system according to the present invention is applied to vehicles in which the power steering system is not mounted or which use the steer-by-wire type steering system, it is necessary to install the servo motor DM shown in each preferred embodiment or to apply a rotation control force to a given steering shaft through a brake system. In the way described above, a corresponding apparatus for generating the steering reaction force on the steering wheel may additionally be required.

As described hereinabove, the steering reaction force control system and method according to the present invention can generate such turning motion information as the yaw rate and/or lateral acceleration on the steering wheel operation system (, i.e., steering wheel). Consequently, the easiness in operation of the steering wheel can remarkably be improved.

In addition, since in the steering reaction force control system and method according to the present invention the motion state variable of the vehicle is derived by the estimation using the above-described vehicle model, the stable and error-free motion state variable value can be obtained as compared with a case in which the motion state variable is obtained through an actual measurement. Especially when the vehicle curves in a transient state (i.e., in the turning transient state described above), it is difficult to actually measure the above-described motion state variable. In this case, it is effective to use the above-described vehicle model as in the present invention.

It will clearly be understood by those skilled in the art that the foregoing description is made in terms of the preferred embodiments and various changes and modifications may be made with departing from the scope of the present invention which is to be defined by the appended claims.

What is claimed is:

1. A system for controlling a steering reaction force for a vehicle, comprising:
   (a) first means for estimating at least motion state variable of the vehicle, when a steering wheel of the vehicle is operated, on the basis of a vehicle model representing a mathematical model of the vehicle having a desired motion performance;
   (b) second means for determining a target value of the steering reaction force imposed on a steering wheel on the basis of an estimation value of the motion state variable estimated by the first means; and
   (c) third means for generating the steering reaction force imposed on the steering wheel which is substantially equal to the target value of the steering reaction force of the steering wheel determined by the second means.

2. The steering reaction force controlling system according to claim 1, wherein said first means estimates an acceleration of the vehicle model in a lateral direction thereof (lateral acceleration) as the motion state variable.

3. The steering reaction force controlling system according to claim 2, wherein said first means comprises:
   (a) fourth means for detecting a steering angle through which the steering wheel is operated;
   (b) fifth means for detecting a speed of the vehicle; and
   (c) sixth means for calculating an estimated value of the lateral acceleration on the basis of the steering angle and vehicle speed detected by the fourth and fifth means.

4. The steering reaction force cancelling system according to claim 3, wherein the sixth means calculates the estimated value of the lateral acceleration using the following equations:

$$\dot{\phi} = \int \ddot{\phi} dt;$$

$$V_Y = \int \dot{V}_y dt;$$

$$\beta_F = (\theta s/N) - (V_y + L_F\dot{\phi})/V;$$

$$\beta_R = -(V_y - L_R\dot{\phi})/V;$$

$$C_F = eK_F \cdot \beta_F;$$

$$C_R = K_R \cdot \beta_R;$$

$$\ddot{\phi} = (2L_F C_F - 2L_R C_R)/I_Z;$$

$$\alpha^* = (2C_F + 2C_R)/M; \text{ and}$$

$$\dot{V}_Y = \alpha^* - V \cdot \dot{\phi},$$

wherein $\dot{\phi}$ denotes a yaw rate of the vehicle model, $\ddot{\phi}$ denotes a yaw angular acceleration of the vehicle model, $V_y$ denotes a lateral acceleration of the vehicle model, $\dot{V}_y$ denotes a lateral translational acceleration of the vehicle, $L_F$ denotes a distance between a front axle and a center of gravity of the vehicle model, $L_R$ denotes a distance between a rear axle and a center of gravity of the vehicle model, $B_F$ denotes a side skid angle of the front wheel of the vehicle model, $B_R$ denotes a side skid angle of the rear wheel of the vehicle model, $C_F$ denotes a cornering force of the front wheel of the vehicle model, $C_R$ denotes a cornering force of the rear wheel of the vehicle model, $eK_F$ denotes an equivalent cornering power of the front wheel of the vehicle model, $K_R$ denotes a cornering power of the rear wheel of the vehicle model, $I_z$ denotes a yaw inertia of the vehicle model, and M denotes a mass of the vehicle model.

5. The steering reaction force controlling system according to claim 2, wherein the second means determines the target value of the steering reaction force from the following equation:

$$T_c = K \times \alpha^*,$$

wherein K denotes a predetermined proportional constant and $\alpha^*$ denotes the estimated value of the lateral acceleration.

6. The steering reaction force controlling system according to claim 5, wherein the proportional constant is set to a value such that a corelationship between the lateral acceleration and steering reaction force is most appropriate.

7. The steering reaction force controlling system according to claim 5, wherein the third means comprises:
   (a) a direct-current servo motor mounted on a steering shaft of a steering arrangement via a speed reducer;
   (b) seventh means for detecting a torque imposed on the steering wheel; and (c) eighth means for controlling a drive current sent to the servo motor so that the steering torque detected by the seventh means coincides with the target value $\overline{T_c}$ determined by the second means.

8. The steering reaction force controlling system according to claim 7, wherein the eighth means controls the drive current sent to the servo motor in accordance with a target value of the drive current derived by a deviation between the target value of the steering reaction force and a value of the steering torque detected by the seventh means and which is multiplied by a predetermined gain.

9. The steering reaction force controlling system according to claim 8, wherein an additional torque imposed on the steering shaft by means of the servo motor adjusts an assistance torque imposed on the steering wheel according to a magnitude of the target value of the steering reaction force and acts to generate a torque in a reverse direction to the direction toward which the steering wheel is rotated.

10. The steering reaction force controlling system according to claim 1, wherein the first means estimates a plurality of the motion state variables and wherein the second means determines the target value of the steering reaction force with estimated values of the motion state variables subjected to a predetermined weighted mean calculation.

11. The steering reaction force controlling system according to claim 10, wherein the first means estimates two motion state variables of the vehicle, the two motion state variables being an acceleration of the vehicle in a lateral direction thereof (lateral acceleration) and yaw rate of the vehicle.

12. The steering reaction force controlling system according to claim 11, wherein the second means determines the target value of the steering reaction force from the following equation:

$$\overline{T_c} = K\{C_1(V) \times V \times \dot{\phi}^* + C_2(V) \times \alpha^*\},$$

wherein K denotes a predetermined proportional constant, V denotes a vehicle speed $\alpha^*$ denotes the estimated value of the lateral acceleration, $\dot{\phi}^*$ denotes the estimated value of the yaw rate, and $C_1(V)$ and $C_2(V)$ denote weight coefficients.

13. A method for controlling a steering reaction force, comprising the steps of:
  (a) setting a vehicle model representing a mathematical model of a vehicle having a desired performance of motion;
  (b) estimating at least one motion state variable of the vehicle on the basis of the vehicle model set in the step (a);
  (c) determining a target value of the steering reaction force imposed on a steering wheel on the basis of an estimation value of the motion state variable estimated in the step (b); and
  (d) generating a steering reaction force imposed on the steering wheel so as to become substantially equal to the target value of the steering reaction force of the steering wheel determined in the step (c).

14. The steering reaction force controlling method according to claim 13, wherein the step (b) comprises the steps of:
  (d) reading a steering angle through which the steering wheel is operated and a vehicle speed; and
  (e) calculating a lateral acceleration of the vehicle model on the basis of the steering angle and vehicle speed read in the step (d) as the motion state variable.

15. The steering reaction force controlling method according to claim 13, wherein the step (b) comprises the steps of:
  (d) reading a steering angle through which the steering wheel is operated and a vehicle speed; and
  (e) calculating a lateral acceleration of the vehicle model and a yaw rate of the vehicle model on the basis of the steering angle and vehicle speed read in the step (d) as a plurality of motion state variables.

16. The steering reaction force controlling method according to claim 15, wherein the step (c) determines the target value of the steering reaction force from the estimation values of the lateral acceleration and yaw rate calculated in the step (e) with these values being subjected to a predetermined weighted mean.

17. A system, comprising:
  a vehicle having a wheels and a steering wheel for determining a driving angle to be assumed by said wheels;
  means for determining a steering angle of said steering wheel;
  means for determining an estimated value of at least one motion state variable of said vehicle based on said steering angle;
  means for determining an appropriate steering reaction force based on said estimated value of said state variable; and
  power assist means for providing a power assist to said steering wheel to aid in moving said wheels to said driving angle, said power assist means being response to said steering reaction force determining means for making an actual steering reaction force at said steering wheel substantially equal to said estimated value when said wheels are at said driving angle determined by said steering wheel.

18. A method, comprising:
  determining a driving angle of wheels of a vehicle based on a steering angle of a steering wheel;
  determining an estimated value of at least one motion state variable of said vehicle based on said steering angle;
  determining an appropriate steering reaction force based on said estimated value of said state variable; and
  providing a power assist to said steering wheel to aid in moving said wheels to said driving angle and modifying said power assist in response to said steering reaction force determining means to make an actual steering reaction force at said steering wheel substantially equal to said estimated value when said wheels are at said driving angle determined by said steering wheel.

* * * * *